3,544,379
FUEL CELL ELECTRODE AND PROCESS
George T. Miller, Lewiston, N.Y., assignor to Hooker
  Chemical Corporation, Niagara Falls, N.Y., a corporation of New York
Continuation-in-part of application Ser. No. 550,245,
  May 16, 1966. This application Mar. 14, 1967, Ser.
  No. 622,959
Int. Cl. H01m 27/04, 13/00
U.S. Cl. 136—86                                10 Claims

ABSTRACT OF THE DISCLOSURE

A fuel cell, utilizing liquid carbonaceous fuels insoluble in the aqueous electrolyte, is provided with a fuel electrode having catalytic points or projections and means for flowing a film of liquid fuel over the electrode face in contact with both such projections and the electrolyte.

CROSS-REFERENCE TO RELATED APPLICATION

This is a continuation-in-part of my application Ser. No. 550,245 filed May 16, 1966, now U.S. 3,361,656.

BACKGROUND OF THE INVENTION

Fuel cells have become known in the art as systems or apparatuses wherein chemical energy resulting from the oxidation of materials such as hydrogen, carbon monoxide, alcohols, hydrocarbons or the like is electrochemically converted to electrical energy at an inert electrode. Preferably, such cells are adapted for continuous operation wherein a fuel and an oxidizer are continuously fed into the cell, the oxidizer being fed to one electrode and the fuel to another. Preferred oxidizers are oxygen, or an oxygen-containing gas, such as air. When the oxidizable material is a gas, such as hydrogen or a low molecular weight hydrocarbon, it is fed into the cell by way of a porous electrode, through which the gaseous material passes into contact with the electrolyte. The fuel electrode commonly is provided with a catalytic material such as platinum on the surface of the electrode and exposed to the electrolyte, whereby the fuel gas fed into the porous electrode comes into contact with both the electrolyte and the catalytic material.

Heretofore, the fuels utilized in fuel cells have been chiefly hydrogen, gaseous hydrocarbons or other carbonaceous gases or water-soluble materials, such as methyl and ethyl alcohols. The use of gaseous fuel requires the employment of porous electrodes which have a number of disadvantages. In addition, for many uses of fuel cells portable small cells are desired which can readily be transported to locations where electric energy is not readily available. For such purposes, a fuel which can be readily stored and handled and is readily available at such locations is highly to be desired; and the liquid hydrocarbon fuels are optimum for these requirements. Thus, any expedition, proceeding to localities where electric energy is not available would generally carry liquid hydrocarbon fuel for their means of transportation and this same fuel, by the employment of my invention, could be used for operating the fuel cells.

In operating a fuel cell with a porous fuel electrode, care must be taken to prevent flooding of the sites of catalytic activity by the electrolyte, thus preventing contact between the fuel and catalyst. When the fuel is liquid there is the added tendency for catalyst sites to be flooded by the liquid fuel. A further difficulty is caused by the tendency of liquid hydrocarbons to plug the pores by deposition of polymerization products. A fuel cell having a layer of liquid hydrocarbon fuel floating on the electrolyte with the electrode extending up into the fuel layer has been proposed, but in this method the electrode surface utilized is confined substantially to the interface of the two liquids or to a very short distance therefrom, complicating the design of a cell having adequate capacity.

SUMMARY OF THE INVENTION

An object of the present invention is the production of electric energy by means of a fuel cell utilizing a liquid fuel. A further object is to provide an improved means for bringing the liquid fuel into contact with the electrolyte and reactive sites on the electrodes. Another object is to bring the liquid fuel into contact with the electrolyte and catalyst over an extended area of the electrode, penetrating deeply into the electrolyte. Still other objects will be apparent from the following description of the invention.

In accordance with this invention I provide a fuel cell having an oxidizable liquid material as fuel and cause the liquid fuel to flow in a thin layer or film over the surface of an electrically conductive, solid electrode which is provided with small projections which are composed of, or coated with, suitable catalytic material. Preferably these catalytic projections are produced by abrading the surface of the electrode material, and the projections thus produced are coated with a suitable catalytic material such as platinum or a noble metal. In one modification utilizing liquid hydrocarbon as fuel, the fuel may be applied at a lower portion of the electrode which is immersed in the electrolyte so that it flows upwardly in a thin layer over the surface of the electrode. The catalytic projections project, through the layer of the liquid hydrocarbon into the electrolyte, so that the hydrocarbon contacts both the catalytic sites and the electrolyte. Preferably, the electrode is provided with vertical grooves, which lead the fuel to reactive sites, uniformly over the face of the electrode.

In another method, I float a layer of liquid hydrocarbon on the aqueous electrolyte and extend through the hydrocarbon layer and into the electrolyte a solid electrode provided with grooves which by capillary action cause liquid hydrocarbon to flow downwardly therein and thence to the edge of the grooves where it comes in contact wtih catalytic projections. Such grooved electrode may be made by grooving the surface of a suitable electroconductive material, abrading the lands between the grooves and coating the resulting minute projections with catalytic material.

In preferred modifications the electrode, except for the catalytic projections, is coated with a material which is preferentially wetted by the liquid fuel rather than by the electrolyte, for example a polymeric organic material substantially inert to both the fuel and electrolyte.

DESCRIPTION OF PREFERRED EMBODIMENTS

Figure 1:
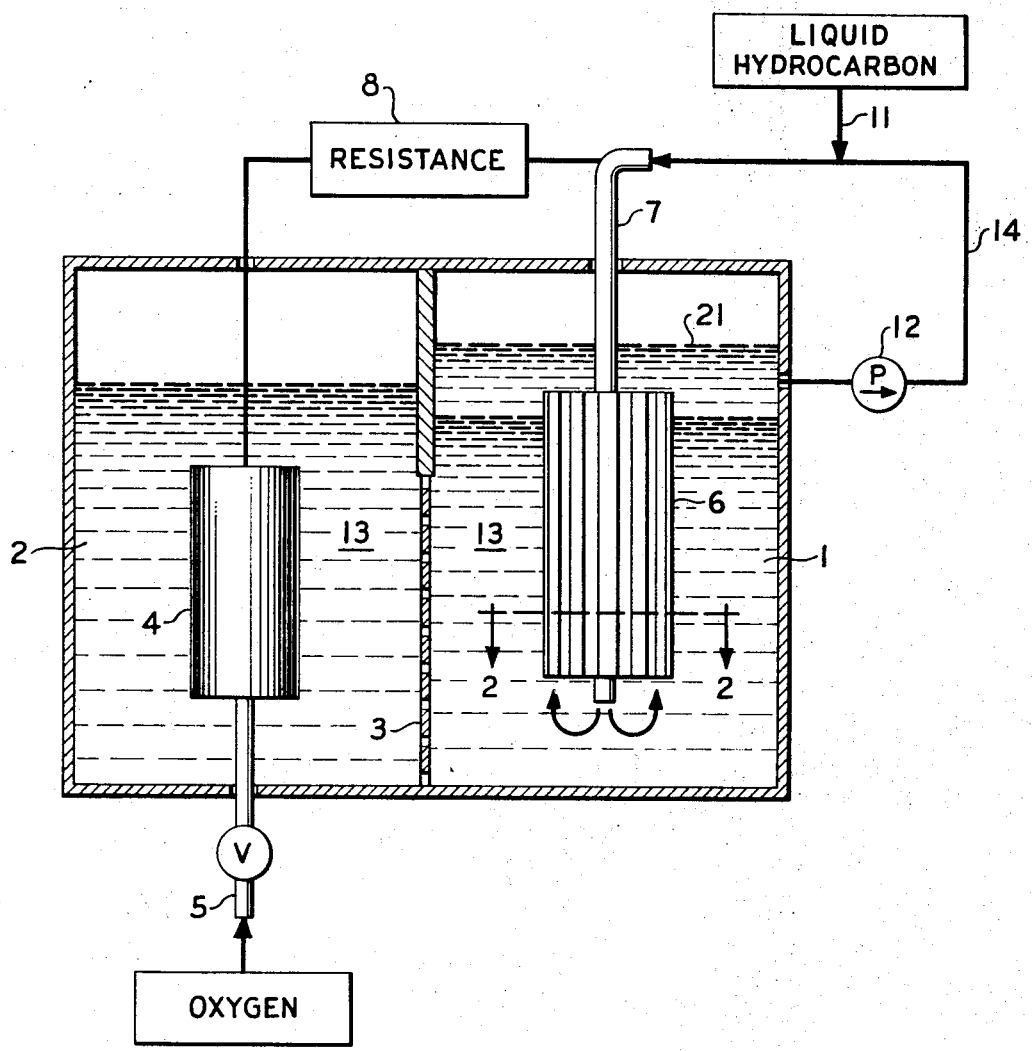
FIG. 1 is a diagrammatic illustration of a fuel cell which embodies the present invention.
Figure 2:
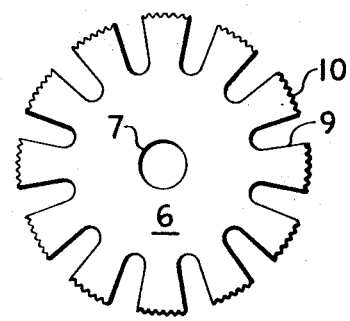
FIG. 2 is a cross-sectional view of an electrode on plane 2—2 of FIG. 1.

The fuel cell illustrated by FIGS. 1 and 2 is provided with fuel electrode compartment 1 and oxidizer electrode compartment 2 which are separated by the porous diaphragm 3. Compartment 2 is provided with a conventional oxidizer electrode 4 made of porous carbon and fed with oxygen or air through inlet pipe 5. Compartment 1 is provided with fuel electrode 6, which may be made of any solid electroconductive material which is suitably inert to the electrolyte and the hydrocarbon liquid, for example, steel, copper or graphite. It is provided with a pipe 7, passing through the length of the electrode. Pipe 7 also functions as the lead for connecting the electrode to resistance 8 to which electrode 4 is also electrically connected. Resistance 8, of course, represents any means for utilizing the electrical power generated by the cell whether by transference into heat, mechanical motion or other form of energy. Pipes 11 and 14 and associated pump 12 serve to flow liquid fuel into pipe 7. Electrode 6 is provided with a plurality of grooves 9 on its surface. The lands 10 between the grooves have been abraded to form small projections thereon, as diagrammatically shown in FIG. 2. These projections are coated with a catalytic material such as platinum by electroplating or other conventional method.

In operation, the cell is charged with a conventional liquid electrolyte 13, for example, a solution of sulfuric or phosphoric acid. Air or oxygen is fed to electrode 4 by means of pipe 5, a liquid hydrocarbon is fed to the cell by way of pipe 11 and is circulated by pump 12 through pipes 14 and 7, from whence it passes into the grooves 9 of the fuel electrode and flows upwardly therethrough, forming a hydrocarbon layer 21 floating on the surface of the electrolyte. As the hydrocarbon passes up through the grooves 9 of the electrode it comes into contact with the catalytic projections on the lands between the grooves, substantially over the entire surface of the electrode immersed in the aqueous electrolyte. By proper adjustment of the rate of flow of the liquid hydrocarbon through pipe 7 any flooding of the reactive sites on the electrode is easily avoided, while at the same time continuous contact of the hydrocarbon with the catalytic material is readily maintained over substantially the entire surface of the electrode immersed in the liquid aqueous electrolyte.

In another method of practicing the invention the flow of electrolyte through pipe 7 may be dispensed with, in which case, a wicking or capillary action of the grooves in the electrode causes the electrolyte to flow, in opposition to the force of gravity, downwardly into the heavier aqueous electrolyte to a substantial distance below the interlayer of hydrocarbon floating on the surface of aqueous electrolyte. For example, it is thus possible to carry the hydrocarbon below the surface to a considerable distance and thence bring it into contact with the electrolytic material on the exterior surface of the electrode. The distance to which the fuel flows downwardly in the grooves depends on the width of the grooves and the respective natures of the fuel and the electrolyte. In this modification, pump 12 may be eliminated, and a suitable layer of liquid hydrocarbon floating on the surface of the aqueous electrolyte may be maintained by feed through pipes 11 and 14, for example, a layer 0.5 to 50 centimeters deep.

In place of the cylindrical electrode shown in FIGS. 1 and 2, my invention may be practiced with a flat or plane fuel electrode. An example, of such plane electrode is shown in FIG. 3, which diagrammatically represents a portion of the electrode surface 15 having the vertical grooves 9 with plateaus or lands 10 between the grooves.

Figure 3:
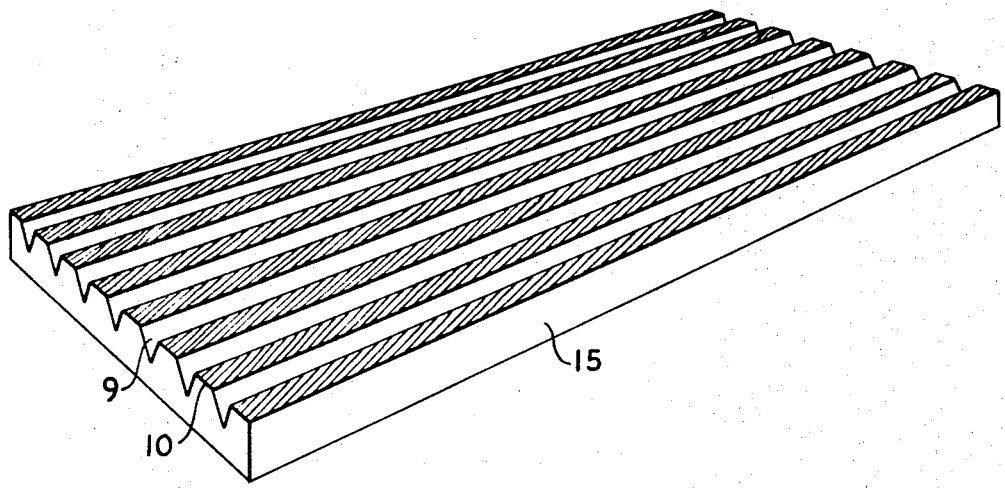
FIG. 3 is a perspective view of the surface of an electrode embodying my invention.
Figure 4:
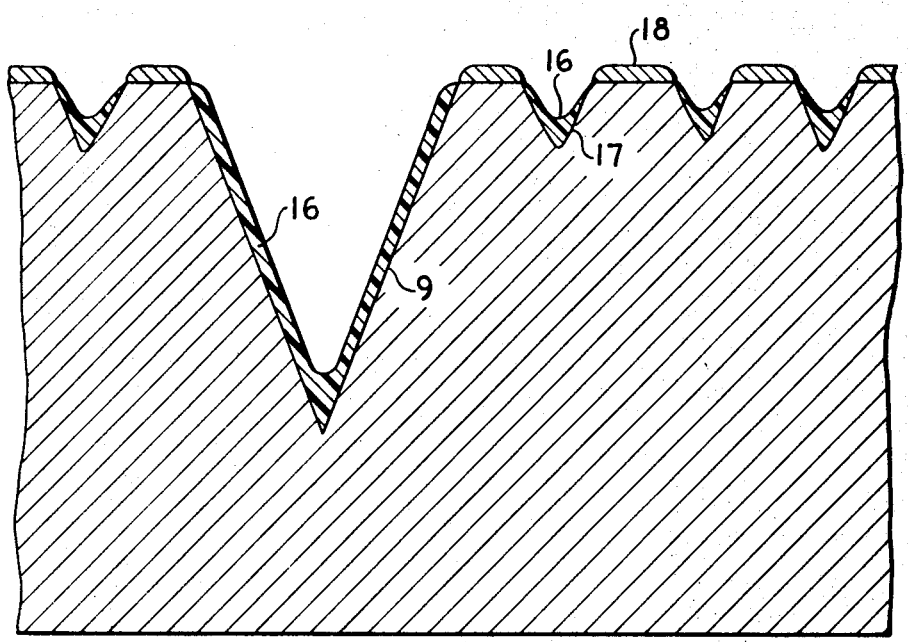
FIG. 4 is a magnified cross-sectional view of an electrode construction according to FIG. 3.

FIG. 4 is a cross-sectional view of a portion of one modification of an electrode surface according to FIG. 3. In this modification, after the grooves are formed in the sheet of electrode conductive material 15 which may be for example graphite or a suitable metal, the lands between the grooves are provided with a series of small grooves or scratches 17 at an angle to the grooves 9. A coating of a polymeric material 16 is coated onto the surfaces of grooves 9 and scratches 17, leaving the upper surfaces of the lands 10 uncoated, or if they become coated, the polymeric coating is removed from these upper surfaces. The upper surfaces then are coated with a catalytic material such as platinum 18. The grooves 9 and the scratches 17 therein in the lands may be formed by a variety of methods well known in the art of metal fabrication, the best mode often depending upon the material used as the electrode substrate. The grooves may be formed by molding, extrusion or by cutting with a tool on a milling machine, for example. The same or similar methods may be used for making the transverse scratches 17 in the lands. One satisfactory method is to merely abrade the lands with an abrasive material such as paper or cloth coated with abrasive grains of suitable coarseness. Another method is to mill with a saw blade that has substantially no set, or negative set, so as to throw up high burrs. When forming these scratches with sharp tools or abrasive, sharp ridges, protuberances, or burrs usually are thrown up on the edge of the scratch, particularly when the substrate is a metal.

Figure 5:
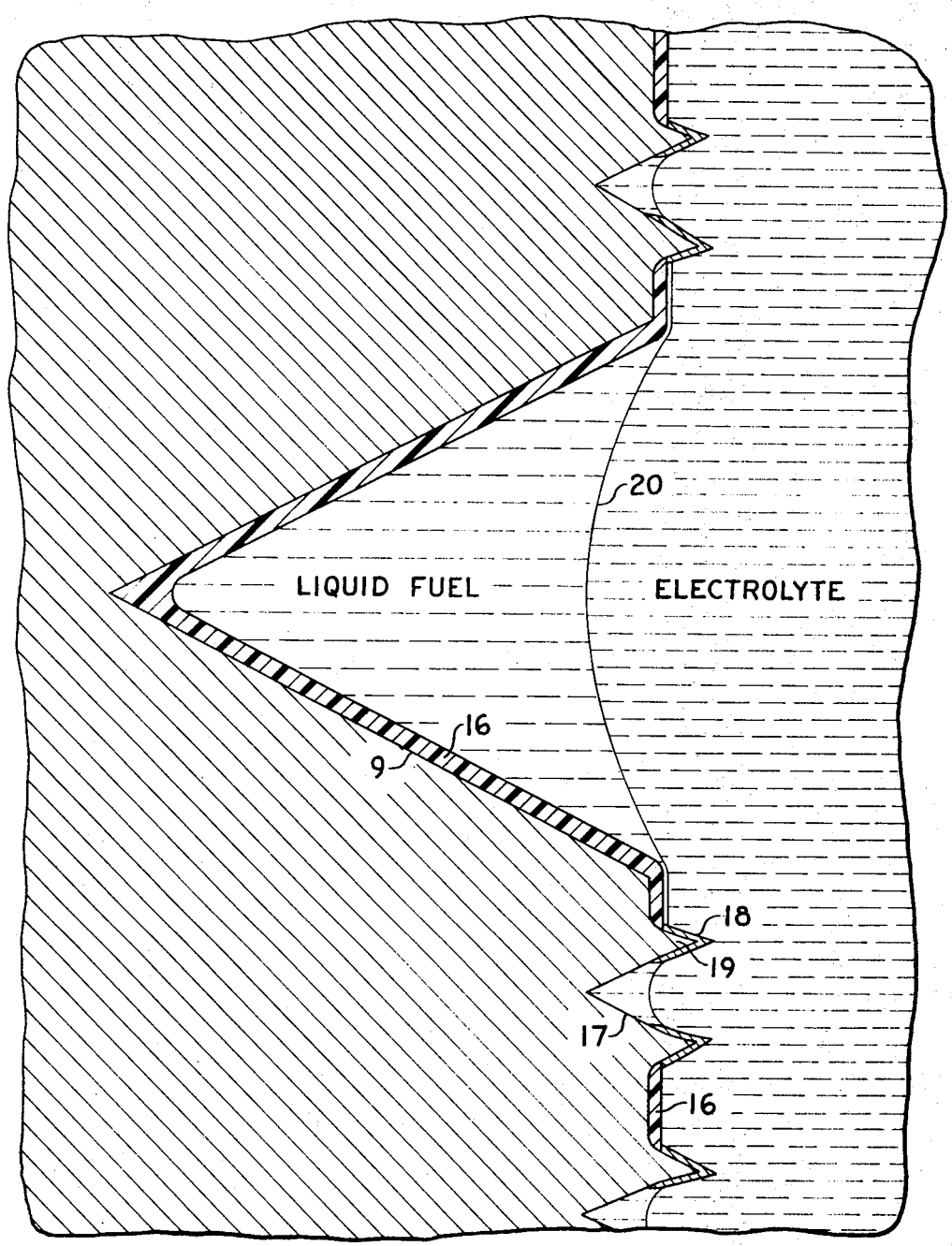
FIG. 5 is a greatly enlarged cross-sectional view of an electrode constructed according to FIG. 3, showing it in operating relationship with the liquid fuel and electrolyte.

FIG. 5 is a cross-sectional view of a fuel electrode in accordance with the present invention greatly magnified to show one of the grooves 9 of FIG. 3 and scratches 17 in the lands adjacent to the groove, which scratches have been formed by abrading the lands with coarse abrasive material. The abrasion forming scratches 17 has thrown up ridges 19 on either side of each scratch. In forming this electrode, after the grooves were formed, the electrode was coated with polymeric material 16, after which the lands were abraded to form the scratches 17. The resulting burrs, protrusions or ridges on the sides of the scratches 17 then were electroplated to form a deposit of platinum metal 18 thereon.

FIG. 5 illustrates the fuel electrode having vertical grooves 9, through which liquid fuel is fed upwardly from the base of the electrode, while the electrode is immersed in the aqueous electrolyte of a fuel cell. Line 20 represents the interface between the liquid fuel, which may be a hydrocarbon, and the aqueous electrolyte. The polymeric coating which is hydrophobic but is wetted by the liquid hydrocarbon, causes the later by capillary action to creep over the outside edges of the groove 9 and into contact with the catalytic material 18 where the latter is also in contact with the electrolyte. The reaction products, water and carbon oxides readily pass away from the electrode surface without interfering with the flow of fuel to the reactive catalytic electrolytic sites.

Polymeric coating 16 preferably is a material which is readily wetted by the liquid fuel and is phobic to the electrolyte. For use with liquid hydrocarbon fuel and an aqueous electrlyte, a coating of polytetrafluoroethylene sold under the trademark, "TEFLON" is a preferred material. Other polymeric materials which are suitably inert to both the liquid fuel and the electrolyte and preferentially wetted by the liquid fuel may be employed, for example, high molecular weight polymers and copolymers of ethylene, propylene, butenes and pentenes and their halogenated derivatives and various vinyl and halovinyl polymers and copolymers.

The polymeric coating may be applied by any conventional means such as coating from solutions or emulsions, polymerization in situ as well as other methods in the art of coating with polymeric materials. While we prefer to have a continuous coating, the invention is operable with a discontinuous coating, particularly when the areas of discontinuity are in the inner recesses of the grooves. Because a function of a coating which is wetted by the liquid fuel, but which is not wetted by the electrolyte, is to draw a film of the liquid fuel by capillary action to the site of catalytic reaction, I prefer to have a good continuous coating of the polymer on the electrode in the areas adjacent to the points of catalytic activity, while such coating at other areas is of less importance.

While it is generally preferable to employ the above described polymeric coating, good results may be obtained without it, especially when the electrode material is readily wetted by the liquid fuel. If the electrode material is more readily wetted by the electrolyte than by the liquid fuel, I prefer to employ the polymeric coating. The fuel electrodes of this invention may be made of any solid electro-conductive material for example, graphite, carbon, or any metal which is compatible with the electrolyte employed, for example, steel, brass, copper, lead, tin and various alloys of these metals. If desired, organic plastic materials which have been rendered electro-conductive by coatings of metal or other conductors or by impregnation with conductive metal or carbon powders may be used. While I generally prefer to use a non-porous material for the electrode, the presence of porosity in the electrode is not in itself detrimental, and hence porous as well as non-porous materials may be used, if desired. Catalytic material preferably is placed only on elevated points or ridges extending above the main electrode surface, for example on the ridges or burrs 19 shown in FIG. 5. This affords the most efficient usage of catalyst material and markedly decreases the cost of the fuel cell when the catalyst material, such as platinum, is expensive.

The function of the diaphragm in a fuel cell is to prevent the fuel from contacting the oxidizing electrode and to keep the oxidizing material from the fuel electrode. Any of the convention devices serving this function may be employed, whether semipermeable diaphragms or merely partitions or submerged wiers.

Example 1

A fuel cell was constructed having a glass shell defining two electrode compartments separated by a fritted glass diaphragm. The oxidizer electrode consisted of a cylinder of platinum screen, and oxygen was introduced below the electrode. The fuel electrode in the other compartment was of graphite, cylindrical, with a copper tube fitted into an axial hole extending through the electrode, substantially as shown in FIGS. 1 and 2 of the appended drawings. There were eleven grooves parallel to the axis about 1 mm. deep and about 0.6 mm. wide. The electrode surface was about 38 square centimeters. The lands between the grooves were abraded with a coarse abrasive paper at an angle to the grooves, and the graphite surface then was platinized for 10 minutes at a current of 100 millivolts, using a standard procedure for electrodeposition of platinum black from dilute chloroplatinic acid solution as described by J. H. Ellis, J. Am. Chem. Soc. 38, 737 (1916).

Both compartments of the cell were charged with 10% aqueous phosphoric acid, and a layer of octane, about 2 cm. deep was placed in the fuel electrode compartment, floating on the aqueous electrolyte. The graphite electrode was placed with vertical axis so that is was partly in the octane layer and partly in the aqueous electrolyte. The area of the electrode in contact with the electrolyte was approximately 30 square centimeters.

A pump was arranged to take octane from the octane layer and force it down through the axial hole of the graphite electrode.

Maintaining a cell temperature of 100° C. and pumping the octane so that it constantly flowed upwardly in the grooves of the electrode, the cell developed a current of 3 milliamperes at 0.34 volt. When the pump was not used, so that the octane flowed down through the grooves by capillary action, the cell current was 3 milliamperes at 0.45 volt.

Example 2

The apparatus and procedure of Example 1 was employed, except that before platinizing, the grooves of the graphite electrode were coated interiorly with "Teflon" polytetrafluoroethylene. This was done by brushing a "Teflon"-water emulsion (approximately 60% solids) into the grooves and heating with a hot-air gun to dry and sinter the "Teflon." With the pump in operation, the cell current was 6.4 milliamperes at 0.31 volt; and with the pump stopped, 7 milliamperes at 0.33 volt.

Example 3

A cylindrical graphite electrode like that of Example 1 was constructed, except that it had 12 grooves and was about 6.8 cm. long by 1.6 cm. in diameter, having an area of about 34 square centimeters. The lands between the grooves were provided with a multitude of scratches made by machining with a sharp tool, at an angle to the grooves. The grooves were coated interiorly with polytetrafluoroethylene and the electrode then was platinized for one minute at a current of 0.1 ampere. Employing the apparatus and procedure of Example 1, pumping the octane, the cell developed a current of 20 milliamperes at 0.21 volt.

While an important object of this invention is to provide a means for utilizing liquid hydrocarbons as fuels in fuel cells, the invention is not restricted thereto and it is applicable to employment of any liquid fuel in a fuel cell. Practically any organic liquid may be utilized, except that liquids such as lower molecular weight alcohols which are readily soluble in the electrolyte are not within the scope of this invention, because they react from solution, whereas my invention comprises reacting a film of liquid fuel on the surface of the electrode in contact with the electrolyte as a separate phase. However, the presence of oxidizable material soluble in the electrolyte in the liquid fuel is not deleterious to the practice of my invention and therefore is included. In addition to liquid hydrocarbons, whether aliphatic or aromatic, I may use nitriles, esters, high molecular weight alcohols and ketones, azo compounds, liquid aromatic acids and other carboxylic compounds. Solutions of solid carbon-containing compounds, such as high molecular weight fatty acids, naphthalene and the like may be utilized by dissolving them in liquid hydrocarbons, other liquid fuel and feeding the solutions to my improved electrode. Likewise, gaseous hydrocarbons or other oxidizable gases dissolved in liquid hydrocarbon may be employed as the liquid fuel. The solvents thus used need not function as fuels, but they may be only partly or substantially completely resistant to oxidation in the fuel cell and function mainly to transport the oxidizable material to the sites of reaction. Solvents thus resistant to oxidation include silicone oils and various halogenated hydrocarbons such as carbon tetrachloride, chloroethylenes and the fluoroethylenes. One function of such solvent is to modify the specific gravity of the fuel stream; for example, the solution may be made heavier than the aqueous electrolyte. It is to be understood that the term "liquid fuel" includes all fuel materials which are liquid at the temperature of the electrolyte in contact with the fuel electrode.

The invention further is not restricted to carbonaceous liquid fuels but any oxidizable liquid material for example, molten phosphorus or molten sulfur, may be used. Thus, in the employment of molten phosphorus, utilizing phosphoric acid as the electrolyte, the phosphorus is oxidized to form phosphoric acid while simultaneously producing an electric current, thereby decreasing the cost of production of the oxidation product. Similarly, sulfur may be converted to sulfurous and sulfuric acids with simultaneous production of electric current.

My invention is adapted for use in any fuel cell whereby a liquid material is electrochemically reacted to produce electric energy. Such cells are well known, employing a variety of materials as reactants, in most cases, oxidation-reduction reactions are utilized, oxygen or other oxidizer being fed to one electrode and an oxidizable material to the other. The most common oxidizing electrode is a porous electrode made of carbon or other electro-conductive material to which is fed oxygen or air. However, my invention which comprises a means for utilizing liquid material as fuel in an oxidizing fuel cell, is not concerned with the nature of the oxidizing electrode or of the oxidizing material, but may utilize any conventional oxidizing electrode. While oxidizing agents for this purpose which have been proposed include solutions of peroxides or other active oxygen-producing compounds or materials such as halogens, particularly chlorine and bromine, I generally prefer to use an oxyen-containing gas, such as air, which is generally available.

What is claimed is:

1. In a process for producing electrical energy in a fuel cell including an electrolyte, an oxidant, and an oxidizable liquid fuel material substantially insoluble in said electrolyte, the improvement which comprises providing said cell with a fuel electrode having elevated areas of catalytic material on a surface exposed to the cell electrolyte and maintaining on said surface a layer of an oxidizable liquid material substantially insoluble in said electrolyte so as to bring said liquid material into contact with the electrolyte and said elevated areas of catalytic material.

2. The process according to claim 1 in which the oxidizable liquid comprises a liquid hydrocarbon and is caused to flow upwardly on the electrode surface.

3. The process according to claim 1 in which said oxidizable liquid and the electrolyte form two contiguous layers and the electrode is provided with vertical grooves adapted to lead the oxidizable liquid to said area of catalytic material.

4. The process according to claim 3 in which the oxidizable liquid comprises a liquid hydrocarbon floating on the surface of the electrolyte, the electrode is positioned so as to extend through the hydrocarbon layer into the electrolyte and hydrocarbon liquid is flowed by capillary action downwardly through grooves in the electrode.

5. An electrode having an electrically conductive surface comprising a plurality of longitudinal grooves and lands defined by said grooves on the electrically conductive surface, said lands having thereon, at an acute angle to said longitudinal grooves, a multiplicity of grooves and lands which define a multiplicity of projections, said lands having a catalyst material deposited thereon and said grooves being free of catalytic material.

6. An electrode according to claim 5 provided with a coating of a polymeric material on non-catalytic surfaces.

7. An electrode according to claim 6 in which the polymeric coating is a polymer of tetrafluoroethylene and the catalytic material is platinum.

8. An electrode according to claim 5 which has a polymeric coating in said grooves.

9. An electrode according to claim 5 in which said catalytic material is deposited onto projections on the surface between said grooves.

10. An electrode according to claim 5 in which said grooves are about 0.4 to 6 mm. wide and about 0.7 to 25 mm. deep.

References Cited

UNITED STATES PATENTS

| | | | |
|---|---|---|---|
| 260,653 | 7/1882 | Brush | 136—44 |
| 3,345,213 | 10/1967 | Lambert et al. | 136—120 X |
| 1,390,696 | 9/1921 | Gertler | 136—128 |
| 2,742,437 | 4/1956 | Houdry | 252—477 X |
| 2,827,536 | 3/1958 | Moore et al. | 117—212 X |
| 2,848,525 | 8/1958 | Schumacher et al. | 136—128 X |
| 2,887,456 | 5/1959 | Halford et al. | 252—477 |
| 3,051,638 | 8/1962 | Clifford et al. | 204—143 |
| 3,206,333 | 9/1965 | Ehrenfeld | 136—86 |
| 3,306,774 | 2/1967 | Dengler | 136—86 |

FOREIGN PATENTS

| | | | |
|---|---|---|---|
| 127,609 | 6/1919 | Great Britain | 252—461 |

ALLEN B. CURTIS, Primary Examiner

U.S. Cl. X.R.

117—37, 212; 136—120